Patented Sept. 30, 1941

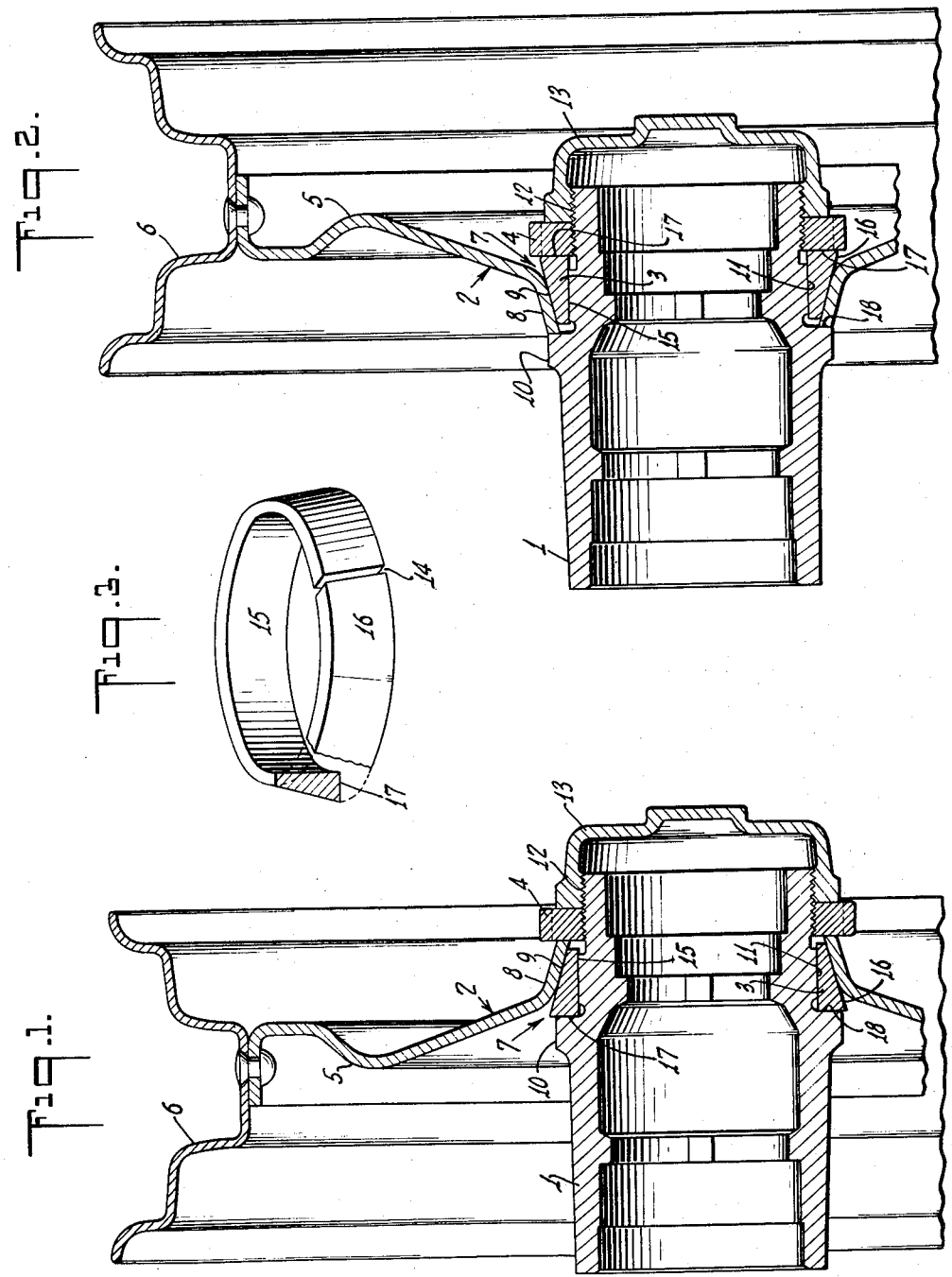

2,257,237

UNITED STATES PATENT OFFICE 2,257,237

WHEEL STRUCTURE

Joseph L. Hecht, Davenport, Iowa, assignor to French & Hecht, Incorporated, a corporation of Iowa Application December 28, 1940, Serial No. 372,078

9 Claims. (Cl. 301—9)

This invention relates to wheel structures and particularly to wheels for vehicles whose use requires or makes it desirable that the track of the wheels, that is the lateral distance between them, may be varied. The class of vehicles to which the invention is mainly directed is that including tractors and farm machinery, where, either because of the character of the landscape or because of the varying manner in which different kinds of vegetation are planted, it would be impossible to adapt a tractor or other farm machinery for many uses if it were not possible to vary the track of the wheels.

The prior art to which the present invention relates suggests different forms of wheel construction and mounting whereby the lateral track of the wheels of a vehicle may be varied, such, for example, as the provision of an elongated axle on which the wheel can be secured in different axial positions; a wheel structure wherein the tread center lies to one side of a transverse plane passing through the center of the hub, so that reversal of the wheel on the axle causes its tread to be closer to or farther from the opposite wheel tread; or a wheel structure in which the tread or rim is movable axially to different positions relatively to the hub. In some instances, too, it has been proposed to combine features of the different forms of wheel construction mentioned to afford a variation of the track of the wheels greater than that which is obtainable by any one of the aforesaid forms of wheel.

The main object of the present invention is to provide an improved form of wheel structure adapted for the aforesaid purpose of varying the track of the wheels of a vehicle, which is capable of speedy and easy manipulation and is simple and economical to manufacture. In the fulfillment of this object, the improved wheel structure constitutes a departure from the forms of wheel construction heretofore known and embodies features and advantages which are not to be found therein.

Among the features of the invention, and of prime importance, is that of a reduced number of parts, which not only lighten the structure but materially decrease its cost of manufacture. Moreover, the few number of parts facilitates the assembly of the wheel structure, as well as the manipulation of the parts in effecting the variation of the track of the wheel.

Another feature of the invention is the provision of a wheel structure wherein the wheel body is demountably supported on the hub, an arrangement which is useful both in effecting the variation of the track of the wheel and for convenience in changing the pneumatic tire mounted on the wheel rim.

Still another feature of the invention is a novel form of means for demountably supporting and securing the wheel body on the hub, whereby a minimum of time and work is required in grinding and finishing surfaces of the hub and wheel body after they are initially formed by casting or stamping, or the like, as the case may be.

Other objects and features of the invention will be apparent from the following detailed description of the preferred embodiment of the invention shown in the drawing.

In carrying out the present invention, and in its broader aspects, the wheel structure comprises a hub and a wheel body secured together by a member removably mounted on the hub and supporting the wheel body, means being provided for fastening said member on the hub. More specifically, the hub is formed on its outer periphery with a relatively low circumferential flange and a cylindrical seat or bearing surface located to one side of the flange. The wheel body is of the dish-shaped disk variety, wherein the tire rim center is axially offset from the central hub receiving opening in the disk; and the hub receiving opening has an inside diameter which is greater than that of the bearing surface formed on the hub but less than that of the hub flange. The member which supports the wheel body on the hub is in the form of a split wedge ring having a cylindrical inner peripheral surface adapted to contact the bearing surface on the hub and a tapered outer peripheral surface adapted to engage the inner wall of the hub receiving opening of the disk, which is inclined at an angle corresponding to the taper of the wedge ring. A nut adapted to be threaded on the hub is provided to secure the wedge ring and the wheel body in position on the hub. With this arrangement, the wedge ring forms a seat for the wheel body which centers the latter on the hub and, at the same time, rigidly supports and secures it thereon under tension by a wedging engagement therewith.

The variable track of the wheel is obtained by a reversal of the wheel body and wedge ring on the hub. In one instance, the wedge ring is arranged on the hub bearing surface to abut against the hub flange with its tapered surface extending axially outward of the hub, and the wheel body is mounted on the wedge ring and placed under tension thereon by tightening the nut on the hub which, in this instance, bears against the outer end of the flange of the hub receiving opening in the wheel body. In the other position of the parts, wherein the wheel body and wedge ring are reversed on the hub, the wheel body is positioned so that the end of the flange of the hub receiving opening in the wheel body bears against the side face of the hub flange, and the wedge ring is entered between the hub bearing surface and the wheel body flange and forced therebetween by tightening the nut on the hub, the nut in this instance bearing against the wedge ring.

In the accompanying drawing, the invention has been shown merely by way of example and in preferred form, and obviously many variations and modifications may be made therein and in its mode of application which will still be comprised within its spirit. It is to be understood, therefore, that the invention is not limited to any specific form or embodiment, except insofar as such limitations are specified in the appended claims.

Referring to the drawing:

Fig. 1 is a vertical section through the hub and wheel body, a part of the wheel body being broken away;

Fig. 2 is a view similar to Fig. 1, showing the parts in a different relative position; and Fig. 3 is a perspective view of the wedge ring, a portion thereof being broken away to show the ring in cross section.

According to the preferred embodiment of the invention shown in the drawing, the wheel structure comprises a hub 1 having a wheel body 2 mounted thereon on a wedge ring 3, the wedge ring and wheel body being secured in position on the hub by a nut 4. In Fig. 1, the parts are shown in the relative positions which they occupy to provide one track of the wheel, the narrow track, and in Fig. 2 they are shown in their relative positions for providing the wide track of the wheel.

The hub 1 is formed on its outer peripheral surface with a circumferential flange 10 which extends radially beyond the outer periphery of the hub for a short distance. At one side of the flange 10, the hub 1 is formed with a cylindrical bearing surface 11, and beyond the bearing surface 11 and end of the hub is threaded as at 12 to receive the nut 4 and a dust cap 13.

The wheel body 2 comprises a disk 5 which supports a rim 6 of the drop center type intended for use with a pneumatic rubber tire. The disk 5 is formed with a flanged central opening 7 adapted to receive the hub 1, the flange 8 defining the opening 7 being inclined toward the axis of the wheel body to present an inclined inner peripheral surface 9. The disk 5, moreover, is of a conventional type wherein the tire rim 6 is supported thereby in axially offset relation to the central hub opening 7.

As stated previously, the central hub receiving opening 7 of the disk 5 is of larger inside diameter than the outside diameter of the bearing surface 11, and the wedge ring 3 is adapted to be interposed between the bearing surface 11 and the disk flange 8. The wedge ring 3 is split, as at 14, and formed with a cylindrical inner periphery 15 and a tapered or inclined outer periphery 16, adapting it to fit over the bearing surface 11 with its outer surface 16 in engagement with the correspondingly inclined surface 9 of the disk flange 8.

When the parts are assembled and in final position, the wedge ring 3 is compressed, causing its inner surface 15 to be brought into firm contact with the bearing surface 11, while its tapered outer surface 16 is forced into wedging engagement with the inner surface 9 of the disk flange 8. Thus is the disk 5 centered and rigidly mounted on and secured to the hub 1 under tension.

In the position of the parts shown in Fig. 1, the narrow track position, the wedge ring 3 is located on the hub bearing surface 11 with the thicker edge 17 thereof abutting the side face 18 of the hub flange 10, whereby the tapered surface 16 of the ring 3 presents an inclined seat for supporting the wheel body 2, which is forced into wedging engagement therewith by the nut 4 screwed on the threaded end of the hub and engaging the outer free end of the disk flange 8.

In the position shown in Fig. 2, the wide track position, the wheel body 2 and the wedge ring 3 are reversed, that is, the wheel body is turned about so that the axially outer face of the disk 5 in the position shown in Fig. 1 becomes the axially inner face in the position shown in Fig. 2, and the thicker edge 17 of the wedge ring faces axially outward instead of axially inward. When the parts are arranged on the hub 1 in this position, the free end of the disk flange 8 abuts against the face 18 of the hub flange 10 and the ring 3 is wedged between the bearing surface 11 on the hub and the inclined inner surface 9 of the disk flange 8, being forced into such wedging engagement by the nut 4 screwed on the end of the hub and bearing against the edge 17 of the ring.

It will be clear from the foregoing description that a variation in the track of the wheel can be very easily effected by a mere reversal of the wedge ring 3 and wheel body 2 on the hub 1. Also, it should be clear that the structure materially decreases manufacturing cost as well as the weight of the wheel because of the few number of parts and the small amount of finishing work required after the hub has been cast or otherwise initially formed. For example, and referring to the outer periphery of the hub only, the only finishing work necessary is to grind the face 18 of the hub flange 10 and the bearing surface 11, and to cut the teeth 12. The disk 5, of course, is stamped to shape and the inner surface 9 of the central hub opening 7 requires little if any finishing to conform to the shape of the wedge ring 3. While all surfaces of the wedge ring 3 must be rather carefully finished, this, of course, is not a difficult operation; and the same is true of the finishing and teeth cutting operations required in connection with the nut 4. The weight of the wheel is reduced as is the cost of manufacture, over the common form of wheel having the disk bolted or riveted to the hub flange, by virtue of the elimination of a long and relatively thick hub flange instead of the flange 10, the bolts or rivets, as the case may be, and the drilling of bolt or rivet holes in the disk and the hub flange, the latter constituting a very considerable cost saving.

Having thus described my invention, what I claim is:

1. In a wheel structure, the combination with a hub and a wheel body, of a member removably mounted on the hub and comprising a support for the wheel body, said member being formed with an inclined bearing surface arranged in wedging engagement with the wheel body, and means securing said member and wheel body on the hub, said hub, wheel body and member being formed so that the member and wheel body may be mounted on the hub in different positions axially relatively thereto.

2. In a wheel structure, the combination with a hub and a wheel body formed with a flanged hub receiving opening, of a member removably mounted on the hub and comprising a support for the wheel body, said member being formed with an inclined bearing surface and the flanged portion of the wheel body being correspondingly inclined and arranged in wedging engagement therewith, and means securing said member and wheel body on the hub, said hub, wheel body and member being formed so that the member and wheel body may be mounted on the hub in different positions axially relatively thereto.

3. In a wheel structure, the combination with a hub and a wheel body, of a transversely split wedge ring removably mounted on the hub and comprising a support for the wheel body, said hub, wheel body and wedge ring being formed so that the wedge ring and wheel body may be mounted on the hub in different positions axially relatively thereto.

4. In a wheel structure, the combination of a hub formed on its outer periphery with a bearing surface extending circumferentially thereof, a wheel body formed with a hub receiving opening of greater diameter than the outside diameter of said bearing surface, a member removably mounted on the hub in contact with said bearing surface and comprising a support for the wheel body, and means for securing said member on the hub, said hub, wheel body and member being formed so that the member and wheel body may be mounted on the hub in different positions axially relatively thereto.

5. In a wheel structure, the combination of a hub formed on its outer periphery with a bearing surface extending circumferentially thereof, a circumferentially extending raised banking surface located at one side of said bearing surface, a transversely split ring mounted on said bearing surface and abutting said banking surface, the outer periphery of said ring being axially inclined, a wheel body formed with a flanged hub receiving opening having an inner peripheral surface inclined to correspond to the inclined surface of the ring and mounted in wedging engagement therewith, and a nut threaded on the hub and bearing against the end of the wheel body flange to secure the wheel body and said ring on the hub.

6. In a wheel structure, the combination of a hub formed on its outer periphery with a bearing surface extending circumferentially thereof, a circumferentially extending raised banking surface located at one side of said bearing surface, a wheel body formed with a flanged hub receiving opening having an inclined inner peripheral surface and mounted on the hub with the end of the flanged portion thereof abutting said banking surface, a split ring mounted on said hub bearing surface and having an inclined outer peripheral surface corresponding to the inclined inner surface of the flanged portion of the wheel body and in contact therewith, and a nut threaded on the hub and bearing against said ring to hold the latter in wedging engagement with the wheel body.

7. In a wheel structure, the combination with a hub formed on its outer periphery with a cylindrical bearing surface and a circumferentially extending raised banking surface located at the axially inner side of said bearing surface, of a transversely split ring formed with a cylindrical inner peripheral surface and an axially inclined outer peripheral surface, the inner surface of said ring engaging said hub bearing surface, a wheel body formed with a flanged hub receiving opening having a correspondingly inclined inner peripheral surface engaging the inclined outer surface of said ring, and a nut threaded on the hub and serving to clamp said ring and wheel body between it and said banking surface, thereby forcing said ring and wheel body into wedging engagement with one another and at the same time compressing the ring into contact with said hub bearing surface.

8. In a wheel structure, the combination with a hub and a wheel body, of a member formed with an inclined outer peripheral surface removably mounted on the hub and comprising a support for the wheel body, said hub, wheel body and member being formed so that the member and wheel body may be mounted on the hub in different positions axially relatively thereto.

9. In a wheel structure, the combination with a hub formed on its outer periphery with a bearing surface which is parallel with the axis of the hub and a raised banking surface located at the axially inner side of said bearing surface, of a transversely split ring formed with an inner peripheral surface which conforms to the shape of said bearing surface and an axially inclined outer peripheral surface, the inner surface of said ring engaging said hub bearing surface, a wheel body formed with a flanged hub receiving opening having a correspondingly inclined inner peripheral surface engaging the inclined outer surface of said ring, and a nut threaded on the hub and serving to clamp said ring and wheel body between it and said banking surface, thereby forcing said ring and wheel body into wedging engagement with one another and at the same time compressing the ring into contact with said hub bearing surface.

JOSEPH L. HECHT.